United States Patent
Morishima et al.

(10) Patent No.: US 9,551,250 B2
(45) Date of Patent: Jan. 24, 2017

(54) OPERATION CONTROL APPARATUS AND METHOD FOR INTERNAL COMBUSTION ENGINE

(71) Applicants: Akinori Morishima, Kanagawa-ken (JP); Kenichi Tsujimoto, Mishima (JP)

(72) Inventors: Akinori Morishima, Kanagawa-ken (JP); Kenichi Tsujimoto, Mishima (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 14/432,281

(22) PCT Filed: Oct. 31, 2012

(86) PCT No.: PCT/JP2012/006995
§ 371 (c)(1),
(2) Date: Mar. 30, 2015

(87) PCT Pub. No.: WO2014/068621
PCT Pub. Date: May 8, 2014

(65) Prior Publication Data
US 2015/0240685 A1 Aug. 27, 2015

(51) Int. Cl.
*F01N 3/18* (2006.01)
*F01N 3/20* (2006.01)
(Continued)

(52) U.S. Cl.
CPC ............. *F01N 3/204* (2013.01); *F01N 3/0256* (2013.01); *F01N 3/0842* (2013.01);
(Continued)

(58) Field of Classification Search
CPC ...... F01N 3/0256; F01N 3/2033; F01N 3/204; F01N 3/38
See application file for complete search history.

(56) References Cited

U.S. PATENT DOCUMENTS

2013/0022505 A1* 1/2013 Tsujimoto ............. F01N 3/2033
422/109
2014/0026545 A1* 1/2014 Mori ..................... F01N 3/2033
60/286

FOREIGN PATENT DOCUMENTS

JP       2006-112401         4/2006
JP       2010077879 A    *   4/2010
(Continued)

OTHER PUBLICATIONS

Machine translation of JP 2010-077879 A, accessed on May 27, 2016.*

*Primary Examiner* — Jonathan Matthias
(74) *Attorney, Agent, or Firm* — Finnegan, Henderson, Farabow, Garrett & Dunner, LLP

(57) ABSTRACT

An operation control apparatus for an internal combustion engine includes: an exhaust emission purifier; a fuel supplying valve for supplying fuel to an exhaust passage; ignition means for igniting the fuel supplied; a warm up determining section for determining whether or not the purifier need be warmed; an exhaust heating determining section for determining whether or not the engine is in an operational state in which the fuel should be ignited and burned; an exhaust heating predicting section for predicting the transition from the operational state in which the fuel should not be ignited and burned to an operational state in which the fuel should be ignited and burned; and a heat generation temperature setting section for setting the temperature of a heating portion of the ignition means based on the result by the heating determining section and the predicting section.

4 Claims, 7 Drawing Sheets

(51) Int. Cl.
- *F01N 3/08* (2006.01)
- *F01N 3/10* (2006.01)
- *F01N 3/38* (2006.01)
- *F01N 9/00* (2006.01)
- *F01N 3/025* (2006.01)
- *F01N 13/00* (2010.01)
- *F02D 41/06* (2006.01)

(52) U.S. Cl.
CPC ........... *F01N 3/0871* (2013.01); *F01N 3/106* (2013.01); *F01N 3/206* (2013.01); *F01N 3/2033* (2013.01); *F01N 3/38* (2013.01); *F01N 9/002* (2013.01); *F01N 13/009* (2014.06); *F01N 13/0097* (2014.06); *F02D 41/068* (2013.01); *F01N 2900/0602* (2013.01); *F01N 2900/08* (2013.01); *F01N 2900/10* (2013.01); *F01N 2900/12* (2013.01); *F01N 2900/1404* (2013.01); *F01N 2900/1602* (2013.01); *Y02T 10/26* (2013.01); *Y02T 10/47* (2013.01)

(56) References Cited

FOREIGN PATENT DOCUMENTS

| | | | | |
|---|---|---|---|---|
| JP | WO 2011125089 A1 | * | 10/2011 | ........... F01N 3/2033 |
| JP | WO 2012140702 A1 | * | 10/2012 | ........... F01N 3/2033 |

* cited by examiner

OPERATION CONTROL APPARATUS AND METHOD FOR INTERNAL COMBUSTION ENGINE

CROSS-REFERENCE TO RELATED APPLICATIONS

This application is a national phase application of International Application No. PCT/JP2012/006995, filed Oct. 31, 2012, the content of which is incorporated herein by reference.

TECHNICAL FIELD

The present invention relates to an operation control apparatus and method for an internal combustion engine that incorporates therein an exhaust heating device for heating exhaust gas to be introduced to an exhaust emission purifier.

BACKGROUND ART

In recent years, for complying with strict exhaust gas regulations applied to an internal combustion engine, it is necessary to activate an exhaust emission purifier at the time of starting up, or to maintain the exhaust emission purifier in an active state during the operation of the internal combustion engine. To this end, Patent Literature 1 has proposed an internal combustion engine in which an exhaust heating device is incorporated in an exhaust passage upstream of the exhaust emission purifier. The exhaust heating device promotes activation of the exhaust emission purifier, or maintains the active state thereof by supplying a heated gas made to generate in the exhaust gas to the exhaust emission purifier placed downstream thereof. For this purpose, the exhaust heating device is generally provided with an igniting unit such as a glow plug for generating heated gas by heating and igniting fuel, and a fuel supplying valve for injecting the fuel toward the igniting unit.

CITATION LIST

Patent Literature

PTL1: Japanese Patent Laid-Open No. 2006-112401

SUMMARY OF INVENTION

Technical Problem

An exhaust heating device disclosed in Patent Literature 1 is designed to supply fuel to an exhaust passage without introducing secondary air to the exhaust passage, and then, ignite the fuel. In this exhaust heating device, the ignition and combustion of the fuel supplied to the exhaust passage are strongly influenced by the state of an exhaust gas fed from the internal combustion engine, in particular, an oxygen concentration or an exhaust gas flow rate. As a consequence, the fuel can be supplied to the exhaust passage to be then ignited only when an accelerator position is 0%, for example, when a vehicle is decelerated or warmed, or only when the fuel injected into a cylinder in the internal combustion engine is a predetermined quantity or smaller.

When the fuel supplied to the exhaust passage is ignited in the exhaust heating device, a heating portion of a glow plug need be heated up to a fuel ignition temperature or higher, e.g., 1100° C. or higher. However, even if the glow plug is switched from a de-energized state to an energized state so as to heat the heating portion in an operational state in which the fuel can be supplied to the exhaust passage to be thus ignited, it takes a considerable time to increase the temperature of the heating portion up to the fuel ignition temperature or higher. Consequently, irrespective of the operational state in which the fuel can burn so as to heat the exhaust gas, the temperature of the heating portion of the glow plug is low, and therefore, the fuel cannot be supplied to the exhaust passage. The exhaust heating device may lose the chance to heat the exhaust gas. In view of this, when the heating portion of the glow plug is continuously held above the fuel ignition temperature or higher irrespective of the operational state of a vehicle in a state in which the exhaust gas is desirably heated, the operational frequency of a generator is increased due to heavier power consumption by a storage battery, thereby degrading fuel efficiency.

OBJECT OF THE INVENTION

An object of the present invention is to provide an operation control apparatus and method for an internal combustion engine, in which an exhaust heating device can be more efficiently operated than the related art.

Solution to Problem

According to a first aspect of the present invention, an operation control apparatus for an internal combustion engine includes: an exhaust emission purifier for purifying exhaust gas from an internal combustion engine; a fuel supplying valve for supplying fuel to an exhaust passage from the internal combustion engine to the exhaust emission purifier; ignition means for igniting the fuel supplied to the exhaust passage by the fuel supplying valve, the ignition means having a heating portion; a warm up determining section for determining whether or not the exhaust emission purifier need be warmed by the fuel supplying valve and the ignition means; an exhaust heating determining section for determining whether or not the engine is in an operational state in which the fuel should be supplied to the exhaust passage by the fuel supplying valve and the fuel should be ignited and burned by the ignition means in a case where the warm up determining section determines that the exhaust emission purifier need be warmed; an exhaust heating predicting section for predicting the transition from the operational state in which the fuel is supplied to the exhaust passage and should not be ignited and burned to an operational state in which the fuel should be supplied to the exhaust passage and should be ignited and burned; and a heat generation temperature setting section for setting the temperature of the heating portion of the ignition means based on the determination result by the exhaust heating determining section and the prediction result by the exhaust heating predicting section.

According to the present invention, if the warm up determining section determines that the exhaust emission purifier need be warmed, the exhaust heating predicting section determines whether or not the engine will be changed from the operational state in which the fuel should be supplied to the exhaust passage and should not be ignited and burned to the operational state in which the fuel should be supplied to the exhaust passage and should be ignited and burned. Here, if the exhaust heating predicting section predicts that the engine will be changed from the operational state in which the fuel should be supplied to the exhaust passage and should not be ignited and burned to the operational state in which the fuel should be supplied to the exhaust passage and should be ignited and burned, the heat generation temperature setting section starts raising the temperature of the heating portion of the ignition means. In parallel with this, the exhaust heating predicting section determines whether or not the engine is in the operational state in which the fuel should be supplied to the exhaust passage and should be ignited and burned. Here, the exhaust heating predicting section determines that the engine is in the operational state in which the fuel should be supplied to the exhaust passage and should be ignited and burned, the fuel is supplied to the exhaust passage by the fuel supplying valve and is ignited and burned by the ignition means, thus raising the temperature of the exhaust gas. In this manner, the exhaust gas having the raised temperature is introduced to the exhaust emission purifier, thus promoting the activation of the exhaust emission purifier.

In the operation control apparatus for an internal combustion engine according to the first aspect of the present invention, the heat generation temperature setting section may switch the temperature of the heating portion of the ignition means to an ignition temperature, at which the fuel can ignite, a preheat temperature that is lower than the ignition temperature, and a non-heat temperature based on the determination result by the warm up determining section, the determination result by the exhaust heating determining section, and the prediction result by the exhaust heating predicting section.

The operation control apparatus for an internal combustion engine further may include a supplying ability determining section for determining whether or not the fuel can be supplied to the exhaust passage by the fuel supplying valve, wherein the fuel supplying valve is operationally controlled based on the determination result by the supplying ability determining section.

In a case where a fluid coupling having a lockup mechanism is interposed between the internal combustion engine and a transmission, the exhaust heating predicting section includes a lockup determining section for determining whether or not the internal combustion engine and the transmission are in a direct coupling operational zone by the lockup mechanism of the fluid coupling, and further, the exhaust heating predicting section can predict the transition to the operational state in which the fuel should be supplied to the exhaust passage and should be ignited and burned if the lockup determining section determines that the internal combustion engine and the transmission are in the direct coupling operational zone. In this case, the lockup determining section further includes: a downshift determining section for determining whether or not the transmission is being downshifted; and a fuel injection quantity determining section for determining whether or not the injection quantity of the fuel to be injected into a cylinder in the internal combustion engine is less than a predetermined quantity, and thus, the lockup determining section can determine that the internal combustion engine and the transmission are in the direct coupling operational zone if it is determined that the transmission is being downshifted and the injection quantity of the fuel to be injected into the cylinder in the internal combustion engine is less than the predetermined quantity.

The exhaust heating predicting section may include: an accelerator position sensor for detecting the position of an accelerator to be operated by a driver; and means for determining the acceleration of a vehicle, and thus, the exhaust heating predicting section may predict the transition to the operational state in which the fuel should be supplied to the exhaust passage and should be ignited and burned based on the acceleration of a vehicle with respect to the position of the accelerator.

The exhaust heating predicting section may include means for determining a distance from an obstacle in front of a vehicle during traveling, and thus, the exhaust heating predicting section may predict the transition to the operational state in which the fuel should be supplied to the exhaust passage and should be ignited and burned based on the distance from an obstacle in front of the vehicle.

In a case where the operation control apparatus for an internal combustion engine further includes a cruise controller for traveling a vehicle at a constant speed, the exhaust heating predicting section may predict the transition to the operational state in which the fuel should be supplied to the exhaust passage and should be ignited and burned according to the stoppage of the traveling at a constant speed by the cruise controller. Here, the heat generation temperature setting section can set the temperature of the heating portion of the ignition means at a non-heat temperature in the case where a vehicle is traveling at a constant speed by the cruise controller.

The operation control apparatus further includes a vehicle navigation system, wherein the exhaust heating predicting section can predict the transition to the operational state in which the fuel should be supplied to the exhaust passage and should be ignited and burned based on a deceleration previously stored in the vehicle navigation system or a relative position between a stopping place and a vehicle.

According to a second aspect of the present invention, an operation control method for an internal combustion engine includes the steps of: determining whether or not to need to warm an exhaust emission purifier by a fuel supplying valve for supplying fuel to an exhaust passage from an internal combustion engine to the exhaust emission purifier and ignition means for igniting the fuel supplied to the exhaust passage by the fuel supplying valve, the ignition means having a heating portion; determining whether or not the engine is in an operational state in which the fuel should be supplied to the exhaust passage by the fuel supplying valve and the fuel should be ignited and burned by the ignition means in a case where it is determined in the determining step that the exhaust emission purifier need be warmed; predicting the transition from the operational state in which the fuel should be supplied to the exhaust passage and should not be ignited and burned to an operational state in which the fuel should be supplied to the exhaust passage and should be ignited and burned; and setting the temperature of the heating portion in the ignition means based on the determination result whether or not the engine is in the operational state in which the fuel should be supplied to the exhaust passage and should be ignited and burned and the prediction result whether or not the engine is changed to the operational state in which the fuel should be supplied to the exhaust passage and should be ignited and burned.

In the operation control method for an internal combustion engine according to the second aspect, the step of setting the temperature of the heating portion of the ignition means can include the step of selecting the temperature of the heating portion of the ignition means from an ignition temperature, at which the fuel can ignite, a preheat temperature that is lower than the ignition temperature, and a non-heat temperature based on the determination result whether or not the exhaust emission purifier need be warmed, the determination result whether or not the engine is in the operational state in which the fuel should be supplied to the exhaust passage and should be ignited and burned, and the prediction result whether or not the engine is changed to the operational state in which the fuel should be supplied to the exhaust passage and should be ignited and burned.

The operation control method can further include the steps of: determining whether or not the fuel can be supplied to the exhaust passage by the fuel supplying valve; and operationally controlling the fuel supplying valve based on the determination result in the determining step.

In a case where a fluid coupling having a lockup mechanism is interposed between the internal combustion engine and a transmission, the step of predicting the transition to the operational state in which the fuel should be supplied to the exhaust passage and should be ignited and burned includes the step of determining whether or not the internal combustion engine and the transmission are in a direct coupling zone by the lockup mechanism of the fluid coupling, and thus, can predict the transition to the operational state in which the fuel should be supplied to the exhaust passage and should be ignited and burned if it is determined that the internal combustion engine and the transmission are in the direct coupling operational zone. In this case, the step of determining whether or not the internal combustion engine and the transmission are in a direct coupling zone further include the steps of: determining whether or not the transmission is being downshifted; and determining whether or not the injection quantity of the fuel injected into a cylinder in the internal combustion engine is less than a predetermined quantity, wherein it is determined that the internal combustion engine and the transmission are in the direct coupling operational zone if it is determined that the transmission is being downshifted and the injection quantity of the fuel injected into the cylinder is less than the predetermined quantity.

The step of predicting the transition to the operational state in which the fuel should be supplied to the exhaust passage and should be ignited and burned includes the steps of: determining the position of an accelerator to be operated by a driver; and determining the acceleration of a vehicle, wherein the exhaust heating predicting section may predict the transition to the operational state in which the fuel should be supplied to the exhaust passage and should be ignited and burned based on the acceleration of a vehicle with respect to the position of the accelerator.

The step of predicting the transition to the operational state in which the fuel should be supplied to the exhaust passage and should be ignited and burned includes the step of: determining a distance from an obstacle in front of a vehicle during traveling, wherein the transition to the operational state in which the fuel should be supplied to the exhaust passage and should be ignited and burned may be predicted based on the distance from an obstacle in front of the vehicle.

In a case where a cruise controller for traveling a vehicle at a constant speed is incorporated in a vehicle having the internal combustion engine mounted thereon, the step of predicting the transition to the operational state in which the fuel should be supplied to the exhaust passage and should be ignited and burned may predict the transition to the operational state in which the fuel should be supplied to the exhaust passage and should be ignited and burned according to the stoppage of the traveling at a constant speed by the cruise controller. In this case, it is preferable that in the step of setting the temperature of the heating portion of the ignition means the temperature of the heating portion of the ignition means should be set at a non-heat temperature in the case where a vehicle is traveling at a constant speed by the cruise controller.

In a case where a vehicle navigation system is incorporated in the vehicle having the internal combustion engine mounted thereon, the transition to the operational state in which the fuel should be supplied to the exhaust passage and should be ignited and burned can be predicted based on a deceleration previously stored in the vehicle navigation system or a relative position between a stopping place and a vehicle in the step of predicting the transition to the operational state in which the fuel should be supplied to the exhaust passage and should be ignited and burned.

Advantageous Effects of Invention

According to the present invention, in the case where the exhaust emission purifier need be warmed, it is determined whether or not the engine will be changed from the operational state in which the fuel should be supplied to the exhaust passage and should not be ignited and burned to the operational state in which the fuel should be ignited and burned. Here, even in the operational state in which the fuel should be supplied to the exhaust passage and should not be ignited and burned, the temperature of the heating portion of the ignition means starts to be raised based on the prediction result. Therefore, the fuel can more rapidly start to be supplied in the operational state in which the fuel should be ignited and burned. As a consequence, it is possible to raise the temperature of the exhaust gas more rapidly than the related art.

In the case where the temperature of the heating portion is set to any one of the ignition temperature, the preheat temperature, and the non-heat temperature based on the need of warming of the exhaust emission purifier, the prediction of the transition to the operational state in which the fuel should be ignited and burned, and the determination of the operational state in which the fuel should be ignited and burned, it is possible to switch the temperature of the heating portion more efficiently than the related art.

The operation of the fuel supplying valve is controlled based on the determination result whether or not the fuel can be supplied to the exhaust passage by the fuel supplying valve, thus securely igniting and burning the fuel so as to heat the exhaust gas.

In the case where the internal combustion engine and the transmission are in the direct connected operational region by the lockup mechanism, the temperature of the heating portion of the ignition means is raised before the operational state in which the fuel should be ignited and burned, thus prolonging a period of time when the fuel ignites and burns more than in the related art. In the same manner, in the case where the transmission is being downshifted and the injection quantity of the fuel to be injected into the cylinder of the internal combustion engine is less than the predetermined quantity, the temperature of the heating portion of the ignition means is raised before the operational state in which the fuel should be ignited and burned, thus prolonging a period of time when the fuel ignites and burns more than in the related art.

In the case of the prediction of the transition to the operational state in which the fuel should be ignited and burned based on the acceleration of the vehicle with respect to the position of the accelerator, the temperature of the heating portion of the ignition means is raised before the operational state in which the fuel should be ignited and burned, thus prolonging a period of time when the fuel ignites and burns more than in the related art.

In the case where the transition to the operational state in which the fuel should be ignited and burned is predicted based on the distance from the obstacle in front of the vehicle, the temperature of the heating portion of the ignition means is raised before the operational state in which the fuel should be ignited and burned, thus prolonging a period of time when the fuel ignites and burns more than in the related art.

In the case where the transition to the operational state in which the fuel should be ignited and burned is predicted according to the stoppage of the traveling at the constant speed by the cruise controller, the temperature of the heating portion of the ignition means is raised before the operational state in which the fuel should be ignited and burned, thus prolonging a period of time when the fuel ignites and burns more than in the related art. Incidentally, in the case where the vehicle is traveling at the constant speed by the cruise controller, the temperature of the heating portion is set to the non-heat temperature, thus suppressing the waste supply of energy to the heating portion of the ignition means.

DESCRIPTION OF EMBODIMENTS

An embodiment, in which the present invention is applied to a vehicle having a compression ignition type multi-cylinder internal combustion engine mounted thereon, will be explained in detail with reference to FIG. 1 to FIG. 7. The present invention is not, however, limited to the embodiment, and the construction may be freely modified according to required characteristics. The present invention is effectively applied to a spark ignition type internal combustion engine in which gasoline, alcohol, LNG (Liquefied Natural Gas), or the like is used as fuel to be ignited by an ignition plug, for example.

Figure 1:
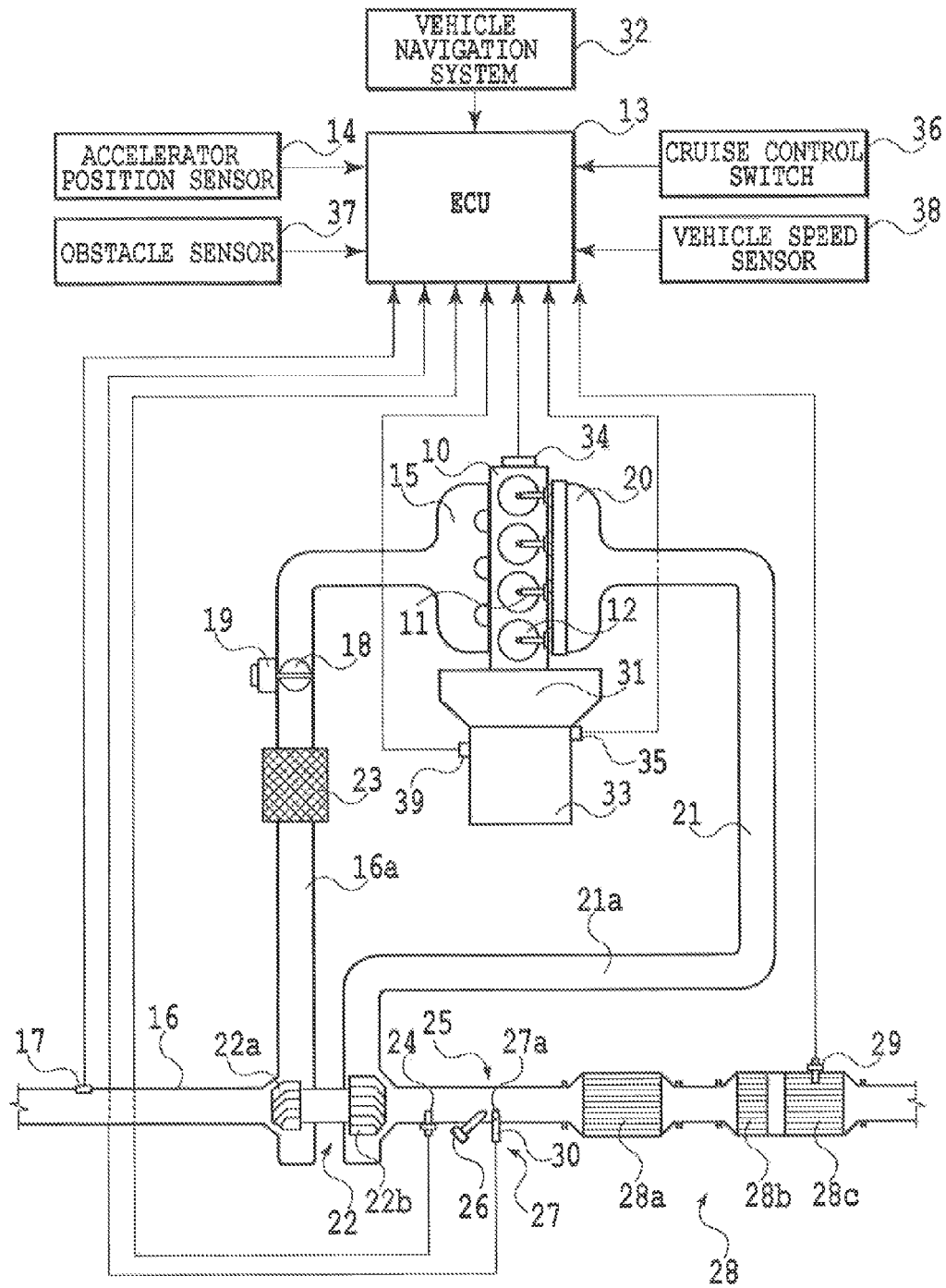
FIG. 1 is an outline diagram showing an engine system in an embodiment in which the present invention is applied to a vehicle mounting a multi-cylinder internal combustion engine of a compression ignition type thereon.
Figure 2:
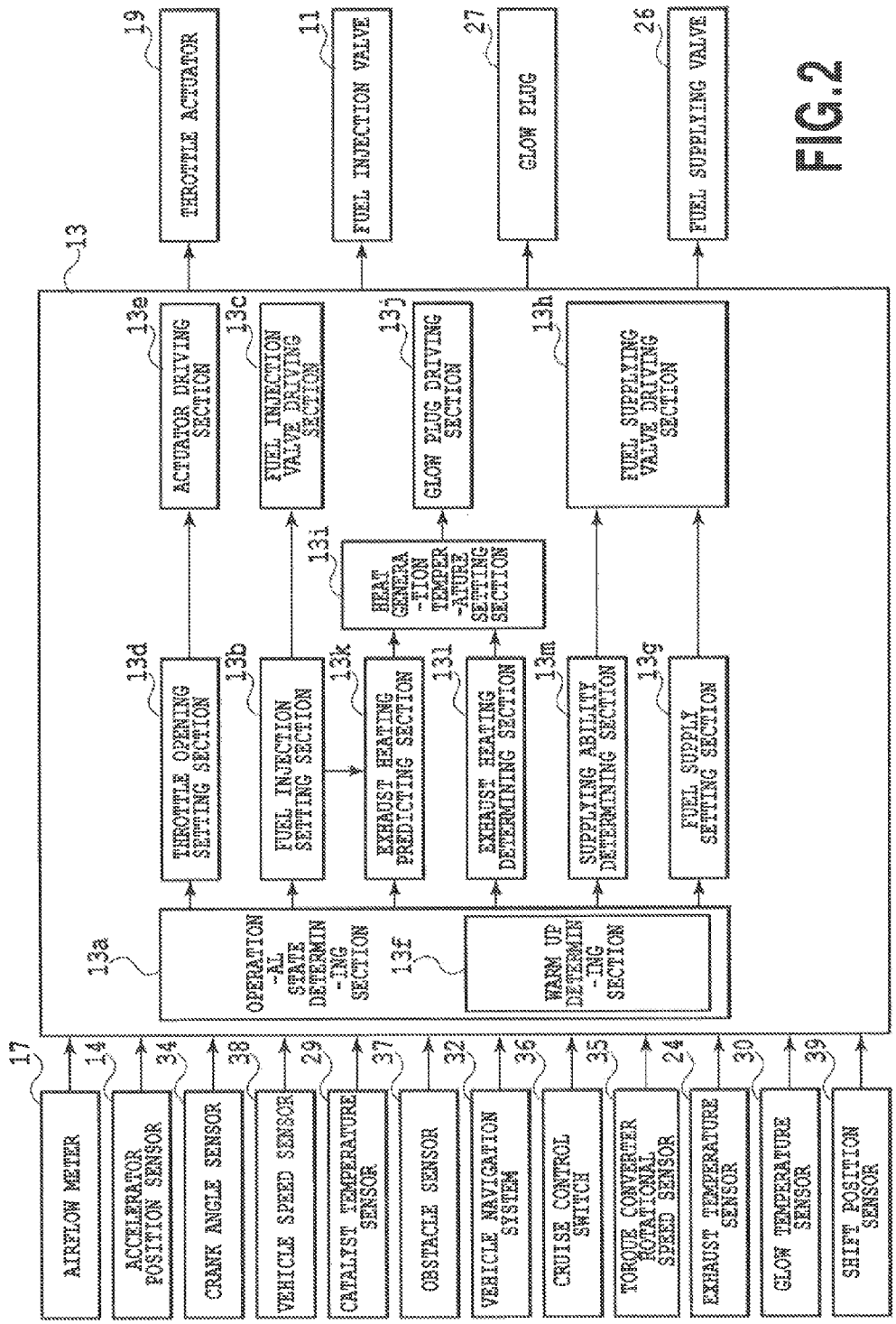
FIG. 2 is a control block diagram of a major part in the embodiment shown in FIG. 1.

FIG. 1 schematically illustrates principal parts of an engine system in the present embodiment. FIG. 2 schematically illustrates a control block for the principal parts. The following parts are omitted from FIG. 1: not only a valve mechanism and a muffler for taking in air and discharging exhaust gas in an engine 10 but also an EGR system and the like which are generally used as auxiliary machines for the engine 10. Furthermore, it should be noted that some of various sensors required for a smooth operation of the engine 10 are omitted for the sake of convenience.

The engine 10 in the embodiment is a multi-cylinder internal combustion engine (four cylinders in FIG. 1) of the compression ignition system in which spontaneous ignition is performed by directly injecting light oil as fuel from a fuel injection valve 11 into a combustion chamber 12 in a compression state. However, according to the characteristics of the present invention, the engine 10 also may be a single-cylinder internal combustion engine. The amount of fuel fed into the combustion chamber 12 through the fuel injection valve 11 as well as an injection timing is controlled by an ECU (Electronic Control Unit) 13 based on the operational state of the vehicle including the position of an accelerator pedal, not shown, as an accelerator according to the present invention. The position of the accelerator pedal pressed by a driver, that is, the position of the accelerator is detected by an accelerator position sensor 14 whose detection information is input into the ECU 13.

The ECU 13 is a well-known one-chip microprocessor, and includes a CPU, a ROM, a RAM, a nonvolatile memory, an input/output interface, and the like that are connected to each other via a data bus, not shown. The ECU 13 in the present embodiment includes an operational state determining section 13a that determines the operational state of a vehicle based on information output from the accelerator position sensor 14 or various sensors, described later, a fuel injection setting section 13b, and a fuel injection valve driving section 13c. The fuel injection setting section 13b sets the quantity and injection timing of fuel injected through the fuel injection valve 11 based on the determination result in the operational state determining section 13a. The fuel injection valve driving section 13c controls the operation of the fuel injection valve 11 such that the quantity of fuel set in the fuel injection setting section 13b is injected through the fuel injection valve 11 at the set timing.

An intake pipe 16 connected to the engine 10 via an intake manifold 15 defines an intake passage 16a together with the intake manifold 15. An airflow meter 17 is fixed upstream of the intake pipe 16. Information on an intake flow rate detected by the airflow meter 17 is input into the ECU 13. The ECU 13 corrects a quantity of fuel injected from the fuel injection valve 11 based on the information detected by the airflow meter 17 and the like. A throttle valve 18 for adjusting the opening of the intake passage 16a and a throttle actuator 19 for driving the throttle valve 18 are disposed on the intake pipe 16 downstream of the airflow meter 17.

The ECU 13 further includes a throttle opening setting section 13d and an actuator driving section 13e. The throttle opening setting section 13d sets not only the position of the accelerator pedal but also the opening of the throttle valve 18 based on the determination result in the operational state determining section 13a. The actuator driving section 15e controls the operation of the throttle actuator 19 such that the throttle valve 18 has the opening set in the throttle opening setting section 13d.

An exhaust pipe 21 connected to the engine 10 via an exhaust manifold 20 defines an exhaust passage 21a together with the exhaust manifold 20.

An exhaust turbocharger (hereinafter simply referred to as a turbocharger) 22 disposed between the intake pipe 16 and the exhaust pipe 21 is adapted to turbocharge the combustion chamber 12 by utilizing kinetic energy of exhaust gas flowing in the exhaust passage 21a so as to enhance the filling efficiency of intake air. A compressor 22a of the turbocharger 22 in the present embodiment is incorporated in the intake pipe 16 between the airflow meter 17 and the throttle valve 18. An exhaust turbine 22a of the turbocharger 22, rotated integrally with the compressor 22a is incorporated in the exhaust pipe 21 downstream of the exhaust manifold 20. An inter-cooler 23 for cooling intake air to increase the filling density of the intake air flowing on the intake passage 16a is incorporated in the intake passage 16a between the compressor 22a of the turbocharger 22 and the throttle valve 18 in the present embodiment.

On the exhaust pipe 21 downstream of the exhaust turbine 22b of the turbocharger 22 are disposed an exhaust temperature sensor 24 for detecting a temperature $T_E$ of exhaust gas flowing in the exhaust pipe 21 to output the resultant detection information to the ECU 13, an exhaust heating device 25, and an exhaust emission purifier 28 in order from upstream.

The exhaust emission purifier 28 is designed to render harmful substance produced by the combustion of an air-fuel mixture inside of the combustion chamber 12 harmless in the present embodiment. The exhaust emission purifier 28 includes an oxidation catalytic converter 28a, a diesel particulate filter (abbreviated as a "DPF") 28b, and an $NO_x$ storage-reduction (abbreviated as "NSR") catalytic converter 28c. The converters and the filter are arranged in order from upstream along the exhaust passage 21a. A well-known configuration other than that of the exhaust emission purifier 28 in the present embodiment may be appropriately adopted.

The operational state determining section 13a in the ECU 13 includes a warm up determining section 13f for determining the need to heat exhaust gas by the exhaust heating device 25 based on the temperature of the exhaust emission purifier 28. In the present embodiment, a catalyst temperature sensor 29 is contained in the NSR catalytic converter 28c, for detecting a bed temperature $T_C$ of the NSR catalytic converter 28c so as to input the bed temperature $T_C$ into the ECU 13. The warm up determining section 13f in the operational state determining section 13a determines that the exhaust heating device 25 need be actuated so as to warm the exhaust emission purifier 28 in a case where the temperature information $T_C$ output from the catalyst temperature sensor 29 is lower than a preset threshold temperature $T_R$.

The exhaust heating device 25 is adapted to produce heated gas, supply the heated gas to the exhaust emission purifier 28 disposed downstream, and maintain the activation in the present embodiment. The exhaust heating device 25 includes a fuel supplying valve 26 and a glow plug 27 as igniting means according to the present invention.

The fuel supplying valve 26 has the same basic configuration as that of the normal fuel injection valve 11. The fuel supplying valve 26 is designed to freely supply an arbitrary quantity of fuel to the exhaust passage 21a at arbitrary time intervals in a pulse fashion by controlling an energization time. A fuel supply setting section 13g in the ECU 13 sets a quantity of fuel once to be supplied from the fuel supplying valve 26 to the exhaust passage 21a based on vehicle operational states including an intake air quantity $G_a$ and temperature information on the exhaust emission purifier 28. Information on the intake air quantity $G_a$ is acquired on the basis of an output from the airflow meter 17. The temperature information $T_C$ on the exhaust emission purifier 28 is acquired on the basis of an output from the catalyst temperature sensor 29. More specifically, the fuel supply setting section 13g calculates a fuel quantity to be supplied to the exhaust passage 21a based on a difference between a target heat temperature set to be higher than the threshold temperature $T_R$ and a current catalyst temperature $T_C$ detected by the catalyst temperature sensor 29. A fuel injection cycle from the fuel supplying valve 26 is set such that the fuel has a predetermined air-fuel ratio based on information on the intake air quantity $G_a$ from the airflow meter 17.

A fuel supplying valve driving section 13h in the ECU 13 controls the drive period and drive cycle of the fuel supplying valve 26 in such a manner that the fuel in the quantity set in the fuel supply setting section 13g has a predetermined air-fuel ratio. In this case, the fuel supplying valve 26 is kept actuated until the fuel supply quantity accumulated after the start of the fuel supply reaches a fuel supply quantity set in the fuel supply setting section 13g.

The glow plug 27 is adapted to ignite the fuel supplied from the fuel supplying valve 26 to the exhaust passage 21a. The glow plug 27 is connected to a power source, not shown, mounted on a vehicle via a heat generation temperature setting section 13i and a glow plug driving section 13j in the ECU 13. The heat generation temperature setting section 13i sets any one of an ignition temperature $T_F$, a preheat temperature $T_H$, and a non-heat temperature $T_N$ for a heating portion 27a disposed at the tip of the glow plug 27 based on signals from an exhaust heating predicting section 13k and an exhaust heating determining section 13l in the ECU 13. For this purpose, the glow plug 27 contains a well-known glow temperature sensor 30 for detecting the temperature of the heating portion 27a so as to input it into the ECU 13. The glow plug driving section 13j controls an energization quantity with respect to the glow plug 27 based on detection information output from the glow temperature sensor 30 so as to achieve the temperature set in the heat generation temperature setting section 13i. The ignition temperature $T_F$ signifies a temperature, at which the fuel can ignite and burn, and which is set at, for example, about 1100° C. The preheat temperature $T_H$ in the present embodiment is set to be lower than the ignition temperature $T_F$, for example, about 800° C. The heating portion 27a of the glow plug 27 has the non-heat temperature $T_N$ when the heating portion 27a receives no electric power. Here, the glow plug 27 as the ignition means according to the present invention may be replaced by a ceramic heater or the like.

The exhaust heating determining section 13l in the ECU 13 determines whether or not the engine 10 is in the operational state in which the fuel is supplied from the fuel supplying valve 26 to the exhaust passage 21a and the fuel is to be ignited and burned by the glow plug 27. The operational state signifies a general warming operation, in which an accelerator position is 0% or the engine 10 is operated with low rotation and at a low load. In other words, the exhaust heating determining section 13l determines that the engine 10 is in the operational state in which the fuel is supplied to the exhaust passage 21a and the fuel is to be ignited and burned in a case where a position detected by the accelerator position sensor 14 is, for example, 5% or lower and an engine speed $N_E$ is a preset reference speed $N_R$ or lower.

A supplying ability determining section 13m in the ECU 13 determines whether or not the engine is in an operational state in which the fuel can continuously ignite and burn when the fuel is supplied to the exhaust passage 21a. Here, the operational state in which the fuel can continuously ignite and burn signifies that all of the three conditions A) to C) below are satisfied: the supplying ability determining section 13m in the ECU 13 determines that the engine 10 is in a fuel suppliable operational state, A): when the heating portion 27a of the glow plug 27 has the ignition temperature $T_F$ or higher;

B): when the temperature $T_E$ of the exhaust gas flowing into the exhaust heating device 25 from the engine 10 is a preset lowest exhaust temperature $T_L$ or higher; and C): when the flow rate $G_a$ of the exhaust gas flowing in the exhaust passage 21a is a preset threshold flow rate $G_R$ or less.

Here, in a case where the temperature $T_E$ of the exhaust gas flowing in the exhaust heating device 25 from the engine 10 is lower than the lowest exhaust temperature $T_L$, this exhaust gas cools the heating portion 27a of the glow plug 27, and consequently, the temperature may be lower than the ignition temperature $T_F$. In the same manner, when the flow rate $G_a$ of the exhaust gas passing the heating portion 27a of the glow plug 27 exceeds the threshold flow rate $G_R$, this exhaust gas cools the heating portion 27a of the glow plug 27, and consequently, the temperature may be lower than the ignition temperature $T_F$.

In this manner, in a case where the supplying ability determining section 13m determines the operational state in which the fuel can continuously ignite and burn, the fuel starts to be supplied from the fuel supplying valve 26 to the exhaust passage 21a, thereby heating the exhaust gas flowing in the exhaust passage 21a.

Prior to the determination of the operational state in which the fuel can be supplied, the exhaust heating predicting section 13k in the ECU 13 determines that the heating portion 27a of the glow plug 27 can be preliminarily heated in a case where any of the following six conditions D) to I) are satisfied under the condition where the exhaust emission purifier 28 need be warmed:

D): in a case where the torque converter 31 is in a lockup operational region;

E): in a case where a traveling state at a constant speed by a cruise controller is cancelled;

F): in a case where a distance between a vehicle and an obstacle in front of the vehicle is decreased down to a predetermined value;

G): in a case where the vehicle travels on a downslope at a predetermined inclination angle or more;

H): in a case where the vehicle approaches a vehicle deceleration zone or a temporary stopping place that is stored in advance in a vehicle navigation system 32 while a predetermined distance remains; and I): in a case where a transmission 33 is being shifted down, and further, an injection quantity $q_F$ of the fuel injected from the fuel injection valve 11 to the combustion chamber 12 is less than a preset determination injection quantity $q_R$, the exhaust heating predicting section 13k determines that the heating portion 27a of the glow plug 27 can be preliminarily heated. Based on the determination result, the heat generation temperature setting section 13i sets the temperature of the heating portion 27a of the glow plug 27 to the ignition temperature $T_F$. The glow plug driving section 13j raises the temperature of the heating portion 27a of the glow plug 27 from the non-heat temperature $T_N$ to the preheat temperature $T_H$.

A lockup determining section, not illustrated, in the exhaust heating predicting section 13k determines whether or not the engine 10 and the transmission 33 are in a direct coupling operational zone by the lockup mechanism, not illustrated, in the torque converter 31. In the case D) where the torque converter 31 is in the lockup operational region, a lockup operational state continues also during the deceleration of the vehicle. Here, when the vehicle does not decelerate even if the lockup operational state continues for a predetermined period of time or longer, the glow plug 27 is continuously preheated, thereby raising the high possibility of the continuation of waste electric power consumption. In view of this, in a case where the vehicle cannot be decelerated even if the lockup operational state continues for the predetermined period of time or longer in the present embodiment, the energization to the glow plug 27 is stopped. Moreover, in a case where the cruise controller selects the constant speed traveling state even if the torque converter 31 is in the lockup operational region, it takes much time until the vehicle is decelerated, and therefore, the temperature of the heating portion 27a is set to the non-heat temperature $T_N$, thereby preventing the energization to the glow plug 27. In the lockup operational region, a transmission input shaft speed $N_I$ is greater than the reference speed $N_R$ previously set according to each of speed change stages, and further, the absolute value of a difference ΔN between the engine speed $N_E$ and the transmission input shaft speed $N_I$ is smaller than a preset determination value a. In view of this, there are provided a crank angle sensor 34 for detecting a rotational phase of a crankshaft, not shown, in the engine 10 so as to input it into the ECU 13; and a torque converter rotational speed sensor 35 for detecting the output shaft (transmission input shaft) speed $N_I$ of the torque converter 31 so as to input it into the ECU 13. The operational state determining section 13a in the ECU 13 calculates the engine speed $N_E$ based on the detection information output from the crank angle sensor 34.

Although the torque converter 31 is used as a fluid coupling in the present embodiment, a fluid coupling other than the torque converter 31 may be used as long as the lockup mechanism capable of directly connecting an input side and an output side is incorporated.

In the case E) where the traveling state at a constant speed by the cruise controller is cancelled, it is determined that there is a high possibility of the deceleration of the vehicle. This can be determined by turning on or off a cruise control switch (hereinafter simply referred to as a "cruise switch") 36.

In the case F) where the distance between the vehicle and an obstacle in front of the vehicle, detected by an obstacle sensor 37, approaches the predetermined value, it is determined that there is a high possibility of the deceleration of the vehicle. In this case, the predetermined value in the present embodiment is set according to the vehicle speed.

In the case G) where the vehicle travels on the downslope at the predetermined inclination angle or more, a vehicle acceleration tends to be increased more than a case where the vehicle travels on a flat road at a predetermined accelerator position. In other words, it is determined based on the accelerator position, the vehicle speed at this time, and the vehicle acceleration at this time that the vehicle travels on the downslope at the predetermined inclination angle or more in a case where the vehicle acceleration is higher than a preset value, and therefore, there is a high possibility that a driver pedals the accelerator at a position of 0% in order to decelerate the vehicle. The vehicle acceleration can be determined based on information output from a vehicle speed sensor 38.

In the case H) where the vehicle approaches the vehicle deceleration zone or the temporary stopping place that are stored in advance in the vehicle navigation system 32 while the predetermined distance remains, it is determined that there is a high possibility that a driver pedals the accelerator at a position of 0% in order to decelerate the vehicle. In this case, the predetermined distance in the present embodiment is set according to the vehicle speed. Incidentally, the vehicle deceleration zone or the temporary stopping place that are stored in advance in the vehicle navigation system 32 is exemplified by a crossing or the toll gate of an expressway.

Also in the case I) where the transmission 33 is being shifted down, and further, the injection quantity $q_F$ of the fuel injected from the fuel injection valve 11 to the combustion chamber 12 is less than the preset determination injection quantity $q_R$, the deceleration of the vehicle is predicted in the near future. A downshift determining section, not illustrated, incorporated in the exhaust heating predicting section 13k can determine the downshift of the transmission 33 based on a detection signal output from a shift position sensor 39 incorporated in the transmission 33. The injection quantity $q_F$ of the fuel injected from the fuel injection valve 11 to the combustion chamber 12 in the engine 10 can be obtained from the fuel injection setting section 13b. A fuel injection quantity determining section, not illustrated, incorporated in the exhaust heating predicting section 13k determines whether or not the injection quantity $q_F$ is less than the determination injection quantity $q_R$.

As described above, when any of the conditions D) to I) are satisfied, the temperature of the heating portion 27a of the glow plug 27 is raised to the preheat temperature $T_H$. Consequently, in an operational state in which the fuel should be ignited and burned, the temperature of the heating portion 27a can be rapidly raised to the ignition temperature $T_F$. As a consequence, the exhaust heat time can be continued by the rapid increase in temperature, thus warming the exhaust emission purifier 28 more rapidly.

Figure 3:
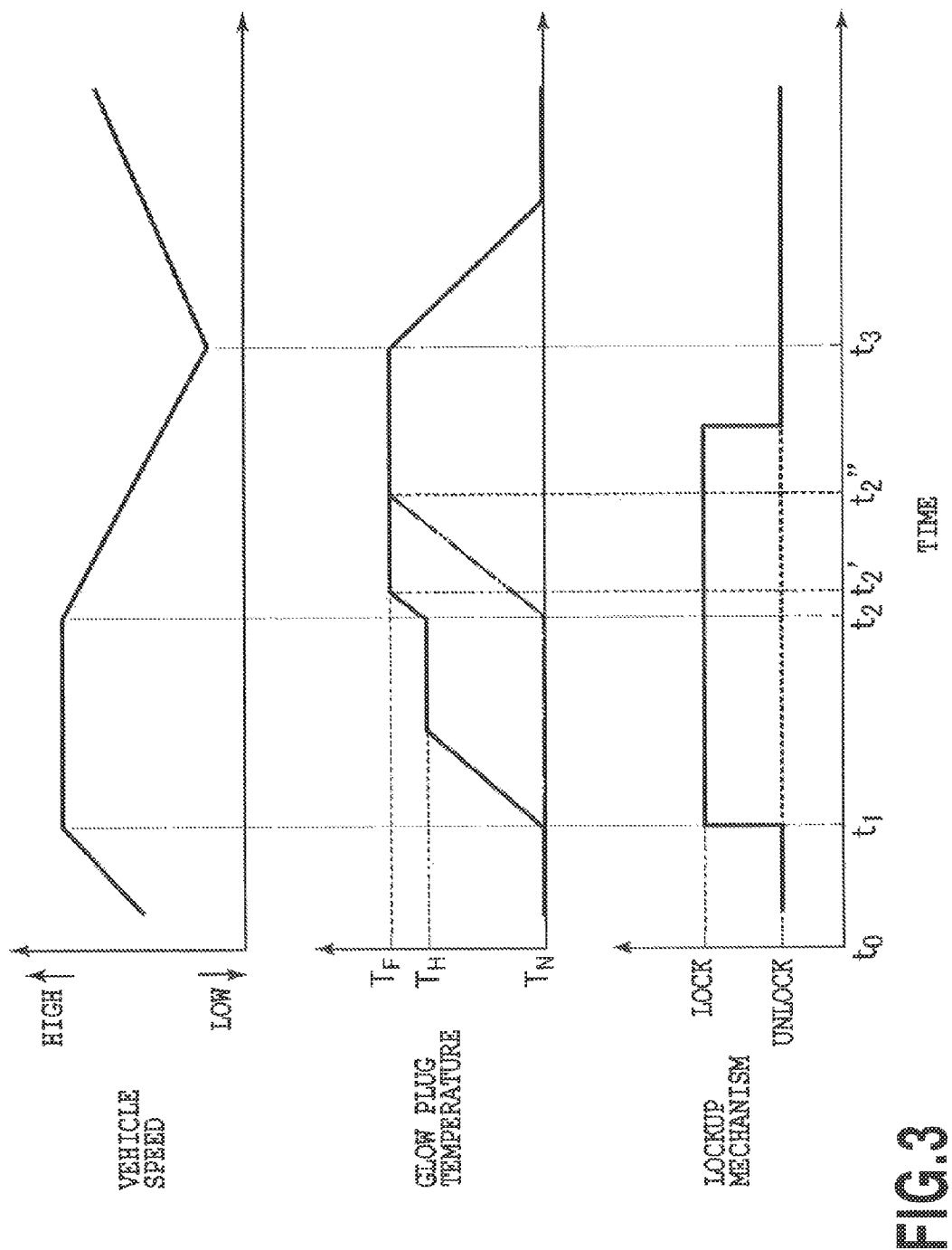
FIG. 3 illustrates timing charts schematically expressing relationships among a change in vehicle speed, the temperature of a heating portion of a glow plug, and a lockup mechanism for a torque converter in the embodiment shown in FIG. 1.
Figure 4:
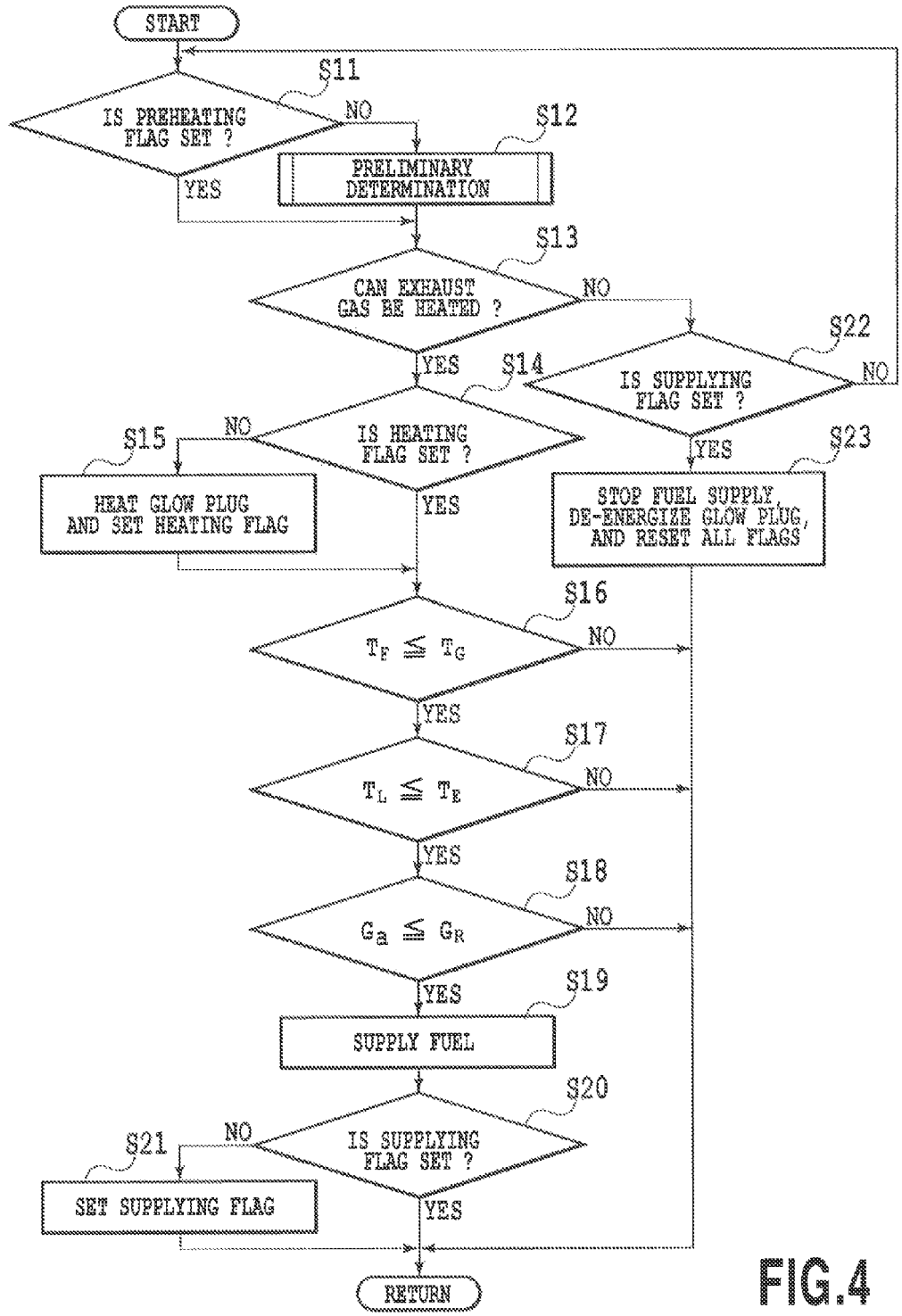
FIG. 4 is a flowchart illustrating control procedures of an exhaust heating device in the embodiment shown in FIG. 1.

For example, FIG. 3 secularly illustrates the schematic relationships among the state of the lockup mechanism, the temperature of the glow plug 27, and the vehicle speed. In the case where it is determined at a time $t_0$ that the exhaust emission purifier 28 need be warmed, the increase in vehicle speed is stopped at a time $t_1$, and further, the lockup mechanism in the torque converter 31 is transited to a lock state. Consequently, the temperature of the heating portion 27a of the glow plug 27 is raised from the non-heat temperature $T_N$ to the preheat temperature $T_H$. The vehicle speed starts to be decreased at a time $t_2$, and accordingly, the temperature of the heating portion 27a of the glow plug 27 is raised from the preheat temperature $T_H$ to the ignition temperature $T_F$. Consequently, the fuel can be supplied, to be then ignited and burned during a period from a time $t_2$' to a time $t_3$ at which the deceleration of the vehicle is ended. In contrast, in the related art indicated by a chain double-dashed line, the temperature of the glow plug 27 need be raised from the non-heat temperature $T_N$ to the ignition temperature $T_F$ at the time $t_2$, and therefore, the fuel is supplied after a time $t_2$" later than the time $t_2$'. It is to be understood that the fuel is supplied for a shorter period of time.

Next, operational procedures of the exhaust heating device 25 in the above-described embodiment will be described with reference to the flowcharts of FIGS. 4 to 7.

First of all, in step S11, it is determined whether or not a preheating flag is set. Since the preheating flag is not set at the beginning, the processing proceeds to step S12. The activation state of the exhaust emission purifier 28 and the preliminary heating of the heating portion 27a of the glow plug 27 are set in a sub-routine of preliminary determination. The preliminary determination in the present embodiment includes whether or not the exhaust heating device 25 need be operated, whether or not the vehicle is in any of the operational states D) to I), and whether or not the temperature of the heating portion 27a of the glow plug 27 need be raised to the preheat temperature $T_H$. The preliminary determination is independently made with respect to the downshifting of the lockup mechanism and the transmission 33, the cruise controller, the obstacle sensor 37, a downslope, and the vehicle navigation system 32. When it is determined in any one or more of the preliminary determinations that the glow plug 27 can be preliminary heated, the temperature of the heating portion 27a of the glow plug 27 is designed to be raised to the preheat temperature $T_H$.

Figure 5:
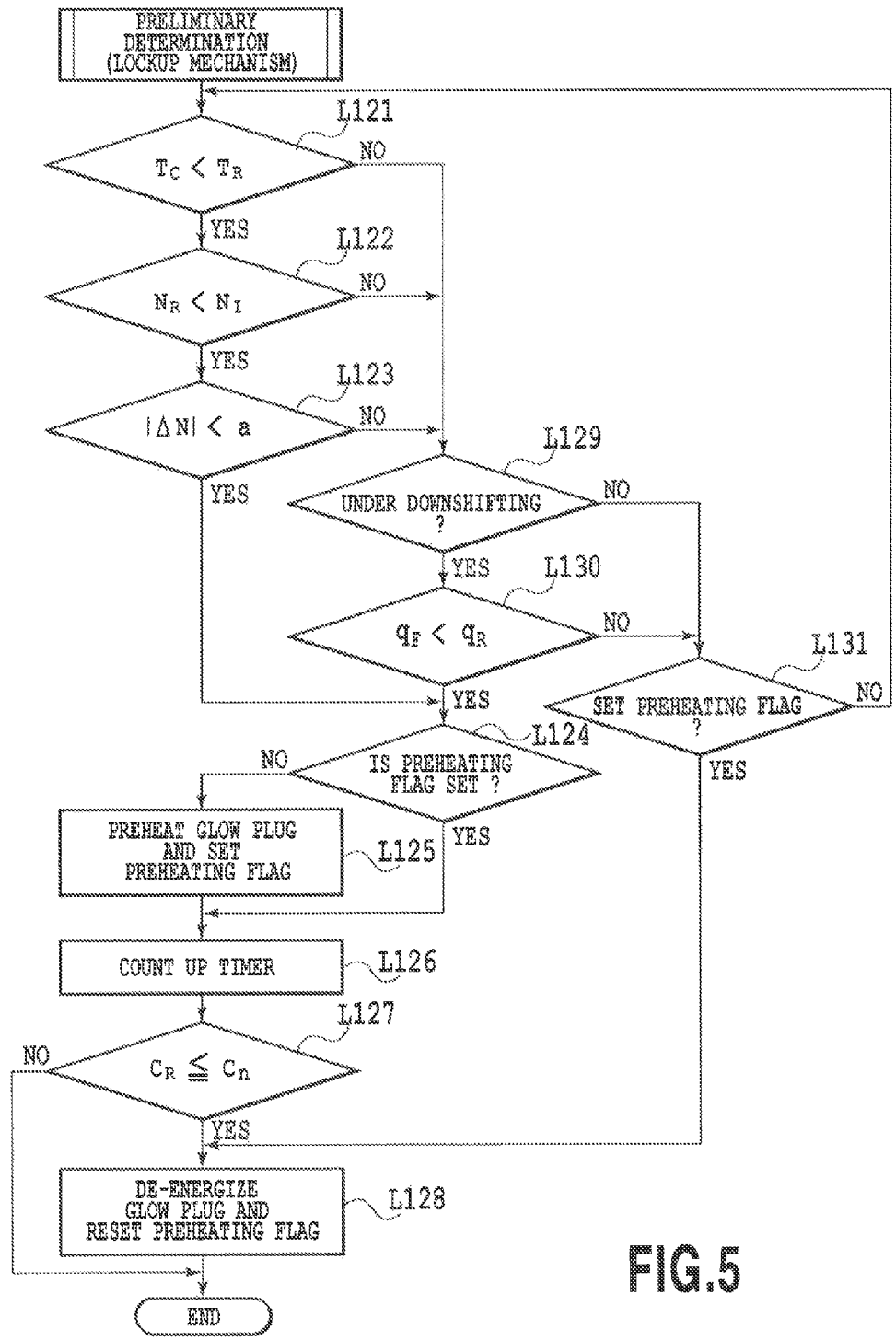
FIG. 5 is a flowchart illustrating the details of a sub routine relevant to the lockup mechanism for the torque converter at the time of preliminary determination illustrated in FIG. 4.

For example, FIG. 5 illustrates the detailed procedures of the preliminary determination of the downshifting of the lockup mechanism and the transmission 33. Specifically, it is determined in step L121 whether or not the catalyst temperature $T_C$ detected by the catalyst temperature sensor 29 is lower than the above-described threshold temperature $T_R$. Here, in the case where it is determined that the catalyst temperature $T_C$ is lower than the threshold temperature $T_R$, that is, the exhaust heating device 25 need heat the exhaust emission purifier 28, to thus activate it, the processing proceeds to step L122. Then, it is determined whether or not the transmission input shaft speed $N_I$ is greater than the reference speed $N_R$ previously set according to each of speed change stages. Here, if it is determined that the transmission input shaft speed $N_I$ is greater than the reference speed $N_R$, that is, there is a possibility that the engine is in a lockup operational region in which a torque increasing function cannot be exhibited, the processing proceeds to step L123. Thereafter, it is determined whether or not the absolute value of the difference $\Delta N$ between the engine speed $N_E$ and the transmission input shaft speed $N_I$ is smaller than the determination value a. Here, if it is determined that the absolute value of the difference $\Delta N$ between the engine speed $N_E$ and the transmission input shaft speed $N_I$ is smaller than the determination value a, that is, there is a possibility that the lockup mechanism is locked and the vehicle is possibly decelerated, the processing proceeds to step L124. After that, it is determined again whether or not the preheating flag is set. Since the preheating flag is not set at the beginning, the processing proceeds to step L125. The temperature of the heating portion 27a of the glow plug 27 is raised to the preheat temperature $T_H$ and the preheating flag is set, and then, the processing proceeds to step L126. In step L126, the timer is counted up. In step L127, it is determined whether or not a count value $C_n$ of the timer is equal to or greater than a count value (hereinafter referred to as a preheating stop determination value) $C_R$ corresponding to a preset time. Since the count value $C_n$ of the timer is smaller than the count value $C_R$ at the beginning, the processing goes out of the sub routine of the preliminary determination, returns to the main routine, and thus, proceeds to step S13.

As described above, the temperature of the heating portion 27a of the glow plug 27 is raised to the preheat temperature $T_H$ in the vehicle operational state in which the lockup mechanism is locked, thus shortening the time at which the temperature of the heating portion 27a of the glow plug 27 is raised to the ignition temperature $T_F$ in the operational state in which the exhaust gas can be actually heated more than that in the related art. As a consequence, a period of time at which the exhaust gas introduced to the exhaust emission purifier 28 is heated is prolonged, so that it is possible to enhance the operational efficiency of the exhaust heating device 25.

If it is determined in the previous step L124 that the preheating flag is set, that is, the temperature of the heating portion 27a of the glow plug 27 is raised to the preheat temperature $T_H$, the above-described processing is repeated until the count value $C_n$ of the timer becomes the preheating stop determination value $C_R$ or greater in step L127. If it is determined in step L127 that the count value $C_n$ of the timer is the preheating stop determination value $C_R$ or greater, that is, the engine is not shifted to the operational state in which the fuel can ignite irrespective of a lapse of a certain time after the temperature of the heating portion 27a of the glow plug 27 is raised to the preheat temperature $T_H$, the processing proceeds to step L128. The heating portion 27a of the glow plug 27 is de-energized, and then, its temperature is returned to the non-heat temperature $T_N$. After the preheating flag is reset, the processing returns to the main routine and proceeds to step S13. In this manner, the heating portion 27a of the glow plug 27 keeps to be heated, thereby suppressing electric power consumption by a vehicle-mounted battery and fuel consumption according to the power generation of a generator, not shown.

Also if it is determined in the previous step L122 that the transmission input shaft speed $N_I$ is the reference speed $N_R$ or lower, that is, the vehicle is not in the lockup operational region but in an operational region in which the torque increase function is exhibited, the processing jumps to step L129. In the same manner, also if it is determined in step L123 that the absolute value of the difference $\Delta N$ between the engine speed $N_E$ and the transmission input shaft speed $N_I$ is the determination value a or greater, that is, the lockup mechanism is in an unlock state, the processing proceeds to step L129. Here, it is determined whether or not the transmission 33 is being downshifted. If it is determined that the transmission 33 is being downshifted, the processing proceeds to step L130. It is determined whether or not the quantity $q_F$ of the fuel injected to the combustion chamber 12 of the engine 10 by the fuel injection valve 11 is smaller than the determination injection quantity $q_R$. Here, if it is determined that the fuel injection quantity $q_F$ is smaller than the determination injection quantity $q_R$, that is, there is a possibility of the transition of the vehicle to the deceleration state, the processing proceeds to step L124. The temperature of the heating portion 27a of the glow plug 27 is raised to the preheat temperature $T_H$.

In contrast, if it is determined in step L129 that the transmission 33 is not being downshifted or in step L130 that the fuel injection quantity $q_F$ is equal to or larger than the determination injection quantity $q_R$, that is, the vehicle is predicted not to be changed to the deceleration state, the processing proceeds to step L131. It is determined whether or not the preheating flag is set. Since the preheating flag is not set at the beginning, the processing returns to step L121, and then, the above-described procedures are repeated. In contrast, if it is determined in step S131 that the preheating flag is set, the processing jumps to step L128. The heating portion 27a of the glow plug 27 is de-energized, and further, the preheating flag is reset.

Also if it is determined in the previous step L121 that the catalyst temperature $T_C$ is the threshold temperature $T_R$ or higher, that is, the catalyst need not be heated, the processing jumps to step L129.

Figure 6:
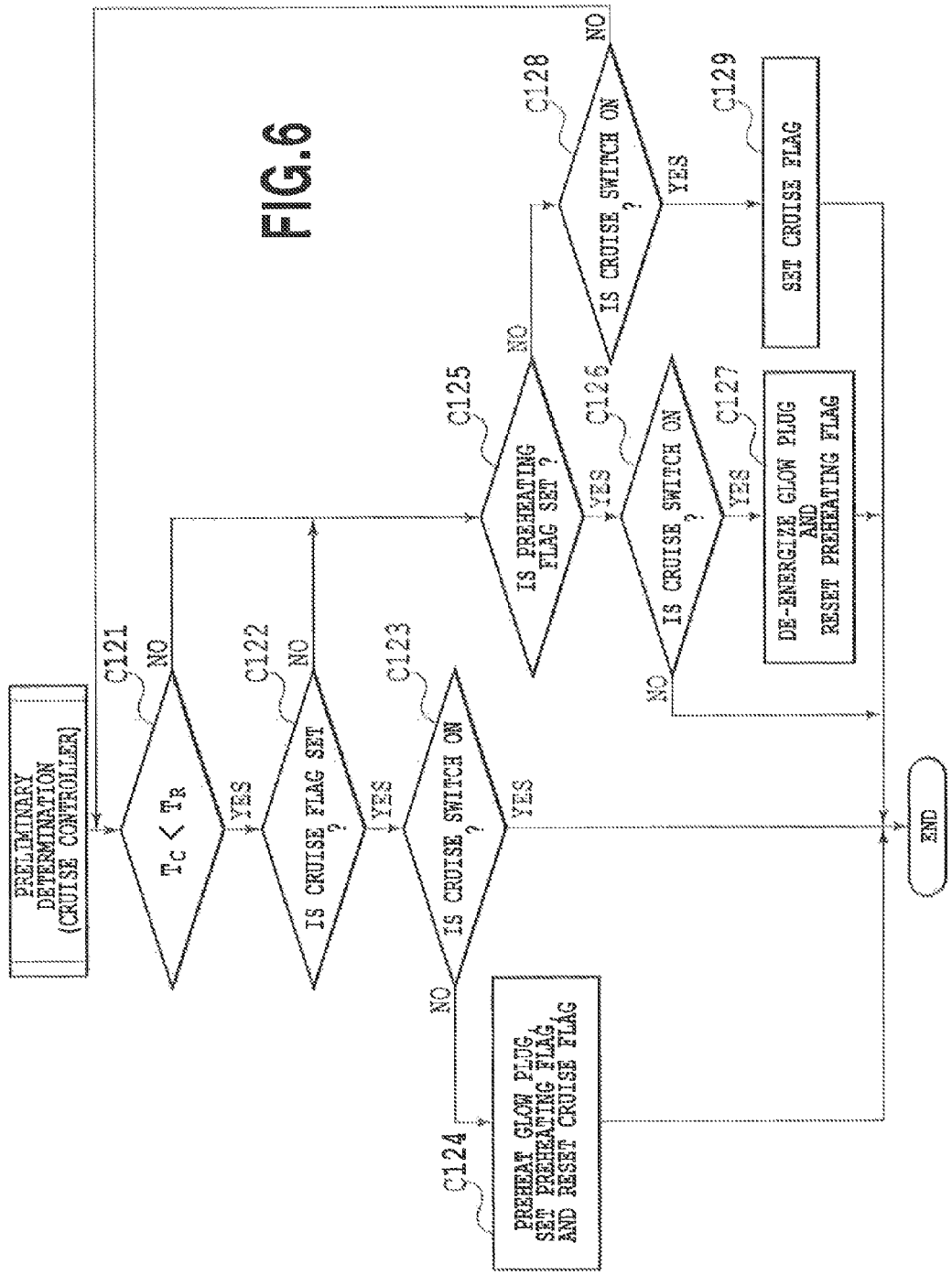
FIG. 6 is a flowchart illustrating the details of a sub routine relevant to a cruise controller at the time of the preliminary determination illustrated in FIG. 4.

FIG. 6 illustrates the details of the preliminary determination with respect to the cruise controller. Specifically, it is determined in step C121 whether or not the catalyst temperature $T_C$ detected by the catalyst temperature sensor 29 is lower than the threshold temperature $T_R$. Here, if it is determined that the catalyst temperature $T_C$ is lower than the threshold temperature $T_R$, that is, the exhaust heating device 25 need heat the exhaust emission purifier 28 and activate it, the processing proceeds to step C122, in which it is determined whether or not a cruise flag is set. Here, if it is determined that the cruise flag is set, that is, the vehicle is traveling at a constant speed, the processing proceeds to step C123, in which it is determined whether or not the cruise switch 36 is ON. Here, if it is determined that the cruise switch 36 is ON, that is, the vehicle keeps traveling at the constant speed, the processing goes out of the sub routine of the preliminary determination without doing anything. The processing returns to the main routine, and therefore, proceeds to step S13.

If it is determined in step C123 that the cruise switch 36 is OFF, that is, there is a possibility that the traveling of the vehicle at a constant speed is canceled and there is a possibility that the vehicle is changed to the deceleration state, the processing proceeds to step C124. Here, the temperature of the heating portion 27a of the glow plug 27 is raised to the preheat temperature $T_H$, the preheating flag is set, and further, the cruise flag is reset. And then, the processing returns to the main routine from the sub routine of the preliminary determination, and thus, proceeds to step S13.

In this manner, the temperature of the heating portion 27a of the glow plug 27 is raised to the preheat temperature $T_H$ at the timing at which the cruise switch 36 is switched from ON to OFF, thus shortening the time at which the temperature of the heating portion 27a of the glow plug 27 is raised to the ignition temperature $T_F$ in the operational state in which the exhaust gas can be actually heated more than that in the related art. As a consequence, a period of time at which the exhaust gas introduced to the exhaust emission purifier 28 is heated is prolonged, so that it is possible to enhance the operational efficiency of the exhaust heating device 25.

If it is determined in the previous step C121 that the catalyst temperature $T_C$ is the threshold temperature $T_R$ or higher, that is, the catalyst need not be heated, the processing jumps to step C125. In the same manner, also if it is determined in step C122 that the cruise flag is not set, that is, the cruise controller does not function, the processing jumps to step C125, in which it is determined whether or not the preheating flag is set. Since the preheating flag is not set at the beginning, the processing proceeds to step C128, in which it is determined whether or not the cruise switch 36 is ON. Here, if it is determined that the cruise switch 36 is ON, that is, the vehicle is being traveling at the constant speed, the processing proceeds to step C129, in which the cruise flag is set. And then, the processing goes out of the sub routine of the preliminary determination and returns to the main routine, and thus, the processing proceeds to step S13.

In contrast, if it is determined in the previous step C129 that the cruise switch 36 is OFF, that is, the cruise controller does not function, the processing returns to step C121, and then, the above-described processing is repeated.

If it is determined in the previous step C125 that the preheating flag is set, that is, the temperature of the heating portion 27a of the glow plug 27 is raised to the preheat temperature $T_H$, the processing proceeds to step C126, in which it is determined whether or not the cruise switch 36 is ON. Here, if it is determined that the cruise switch 36 is ON, that is, the vehicle cannot be decelerated, the processing proceeds to step C127, in which the heating portion 27a of the glow plug 27 is de-energized, and then, the temperature of the heating portion 27a of the glow plug 27 is returned to the non-heat temperature $T_N$. After the preheating flag is reset, the processing returns to the main routine, and then, proceeds to step S13. In contrast, if it is determined in step C126 that the cruise switch 36 is OFF, that is, there is a possibility that the vehicle is changed to the deceleration state, the heating portion 27a of the glow plug 27 keeps energized, and thus, the processing returns to the main routine and proceeds to step S13.

Figure 7:
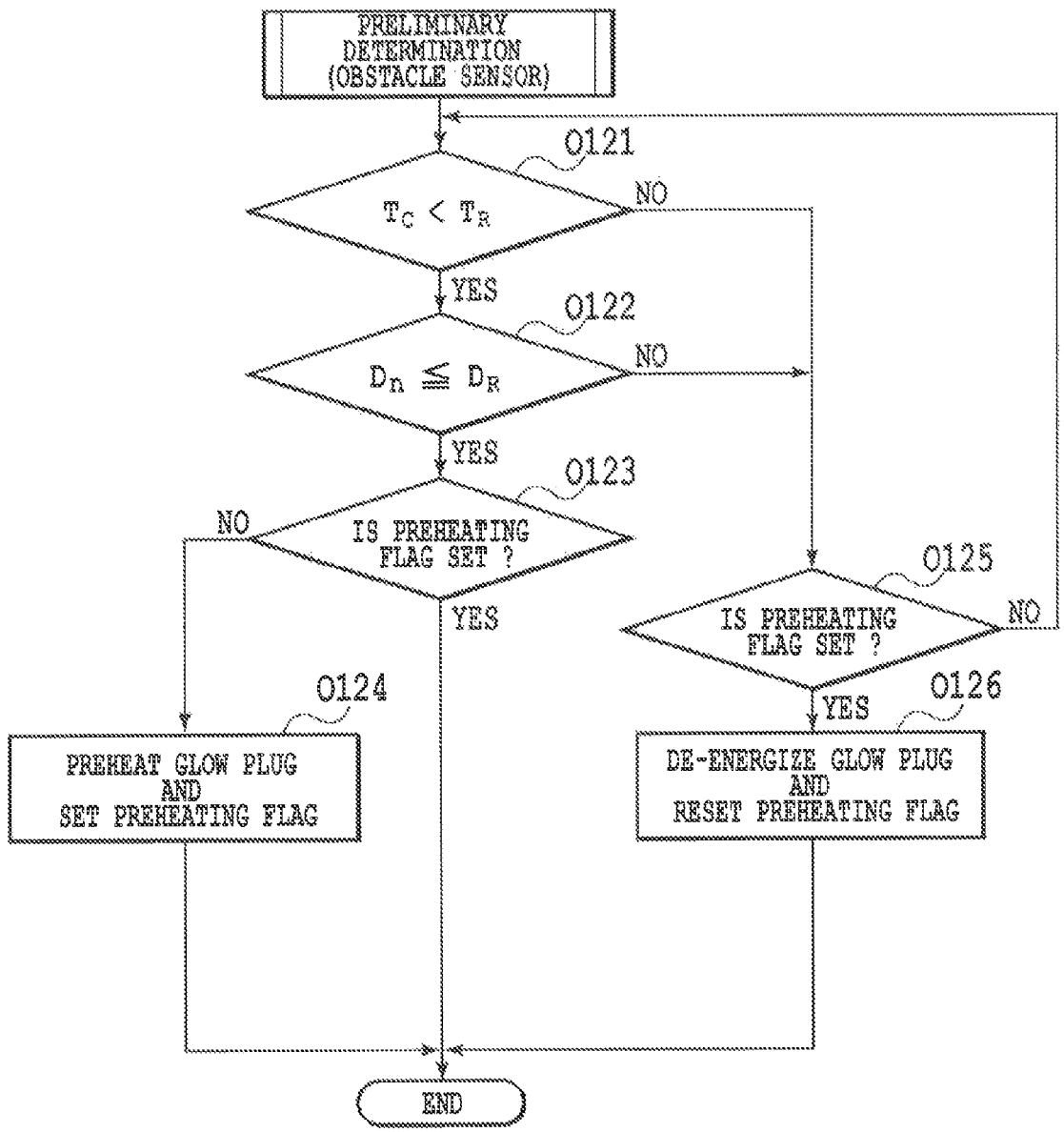
FIG. 7 is a flowchart illustrating the details of a sub routine relevant to an obstacle sensor at the time of the preliminary determination illustrated in FIG. 4.

FIG. 7 illustrates the details of the preliminary determination with respect to the obstacle sensor 37. Specifically, it is determined whether or not the catalyst temperature $T_C$ detected by the catalyst temperature sensor 29 is lower than the threshold temperature $T_R$. Here, if it is determined that the catalyst temperature $T_C$ is lower than the threshold temperature $T_R$, that is, the exhaust heating device 25 need heat the exhaust emission purifier 28 and activate it, the processing proceeds to step O122. It is determined whether or not a distance $D_n$ from the vehicle detected by the obstacle sensor 37 to an obstacle in front of the vehicle is equal to or less than a threshold $D_R$ preset according to the vehicle. Here, if it is determined that the distance $D_n$ from the vehicle to the obstacle in front of the vehicle is equal to or less than the threshold $D_R$, that is, there is a high possibility of the deceleration of the vehicle, the processing proceeds to step O123, in which it is determined whether or not the preheating flag is set. Since the preheating flag is not set at the beginning, the processing proceeds to step O124, and then, the temperature of the heating portion 27a of the glow plug 27 is raised to the preheat temperature $T_H$ and the preheating flag is set. And then, the processing proceeds from the sub routine of the preliminary determination to the main routine, and thus, the processing proceeds to step S13.

In this manner, the temperature of the glow plug 27 is raised to the preheat temperature $T_H$ at the timing at which the distance $D_n$ from the vehicle to the obstacle in front of the vehicle becomes equal to or less than the threshold $D_R$, thus shortening the time at which the temperature of the glow plug 27 is raised to the ignition temperature $T_F$ in the operational state in which the exhaust gas can be actually heated more than that in the related art. As a consequence, a period of time at which the exhaust gas introduced to the exhaust emission purifier 28 is heated is prolonged, so that it is possible to enhance the operational efficiency of the exhaust heating device 25.

In contrast, if it is determined in the previous step O121 that the catalyst temperature $T_C$ is the threshold temperature $T_R$ or higher, that is, the catalyst need not be heated, the processing jumps to step O125. In the same manner, also if it is determined that the distance $D_n$ from the vehicle to the obstacle in front of the vehicle is greater than the threshold $D_R$, that is, there is not yet the possibility of the deceleration of the vehicle, the processing jumps to step O125, in which it is determined whether or not the preheating flag is set. Here, if it is determined that the preheating flag is set, that is, the temperature of the heating portion 27a of the glow plug 27 is raised to the preheat temperature $T_H$, the processing proceeds to step O126. Here, the heating portion 27a of the glow plug 27 is de-energized, and further, the temperature of the heating portion 27a is returned to the non-heat temperature $T_N$, and then, the preheating flag is reset. Thereafter, the processing returns to the main routine, and then, proceeds to step S13. In contrast, if it is determined in step O125 that the preheating flag is not set, the processing returns to step O121, and thus, the above-described processing is repeated.

The details of the preliminary determination with respect to the downslope are basically identical to those of the preliminary determination with respect to the obstacle sensor 37 illustrated in FIG. 7. Specifically, in place of step O122, a vehicle acceleration $\alpha_R$ predicted during traveling on a flat road at the same accelerator position is subtracted from an actual vehicle acceleration $\alpha_n$ at the current accelerator position set by a driver, and then, it is determined whether or not the vehicle acceleration $\alpha_R$ is greater than a preset determination value $\Delta\alpha$. Here, if it is determined that $(\alpha_n - \alpha_R)$ is greater than the determination value $\Delta\alpha$, that is, the vehicle travels on a downslope, it is determined that the possibility of the deceleration of the vehicle is high, so that the temperature of the heating portion 27a of the glow plug 27 is raised to the preheat temperature $T_H$.

The details of the preliminary determination with respect to the vehicle navigation system 32 are basically identical to those of the preliminary determination with respect to the obstacle sensor 37 illustrated in FIG. 7. Specifically, in place of step O122, it is determined whether or not a distance between the position of the traveling vehicle and the deceleration zone or the temporary stopping place of the vehicle forward in the travel direction of the vehicle previously stored in the vehicle navigation system 32 becomes equal to or smaller than a threshold set according to the vehicle traveling speed. Here, if it is determined that the distance to the deceleration zone or the temporary stopping place of the vehicle forward in the travel direction of the vehicle becomes equal to or smaller than the threshold, the possibility of the deceleration of the vehicle is high, and therefore, the temperature of the heating portion 27a of the glow plug 27 is raised to the preheat temperature $T_H$.

In this manner, the sub routine of each of the above-described preliminary determinations is carried out, and then, the processing proceeds to step S13, in which it is determined whether or not the engine is in the operational state in which the fuel can ignite when the fuel is supplied to the exhaust passage 21a. Specifically, the operational state signifies, for example, when the accelerator position is 0% or when the quantity $q_F$ of the fuel injected to the combustion chamber 12 of the engine 10 by the fuel injection valve 11 is the determination injection quantity $q_R$ or smaller. Here, if it is determined that the engine is in the operational state in which the fuel can ignite when the fuel is supplied to the exhaust passage 21a, the processing proceeds to step S14. Here, it is determined whether or not the heating flag is set. Since the heating flag is not set at the beginning, the processing proceeds to step S15, in which the glow plug 27 is heated up to the ignition temperature $T_F$, and further, the heating flag is set. Thereafter, the processing proceeds to step S16.

Here, when the temperature of the heating portion 27a of the glow plug 27 is previously raised to the preheat temperature $T_H$, a time at which the temperature of the heating portion 27a of the glow plug 27 is raised to the ignition temperature $T_F$ can be shortened in step S15. Consequently, it is highly possible to more prolong a period of time when the heated exhaust gas is supplied to the exhaust emission purifier 28.

It is determined in step S16 whether or not when a temperature $T_G$ of the heating portion 27a of the glow plug 27 is raised to the ignition temperature $T_F$ or higher. Here, if it is determined that the temperature $T_G$ of the heating portion 27a of the glow plug 27 is the ignition temperature $T_F$ or higher, that is, the fuel can ignite and burn when the fuel is supplied to the exhaust passage 21a by the fuel supplying valve 26, the processing proceeds to step S17. Here, it is determined whether or not the exhaust temperature $T_E$ of the exhaust gas introduced from an exhaust port of the engine 10 to the exhaust pipe 21 is the lowest exhaust temperature $T_1$, or higher. Here, if it is determined that the exhaust temperature $T_E$ of the exhaust gas introduced to the exhaust heating device 25 is the lowest exhaust temperature $T_L$ or higher, that is, there is no fear of degradation of the ignition of the fuel since the exhaust temperature $T_E$ is too low, the processing proceeds to step S18. Here, it is determined whether or not the flow rate $G_a$ of the exhaust gas flowing in the exhaust passage 21a is the threshold flow rate $G_R$ or less. Here, if it is determined that the flow rate $G_a$ is the threshold flow rate $G_R$ or less, that is, there is little fear of the extinction of the ignited fuel caused by an exhaust gas current, the processing proceeds to step S19. Here, the fuel is supplied to the exhaust passage 21a by the fuel supplying valve 26, and then, is ignited and burned by the heating portion 27a of the glow plug 27. The resultant high-temperature exhaust gas is introduced into the exhaust emission purifier 28, thereby activating the exhaust emission purifier 28. Next, it is determined in step S20 whether or not the supply flag is set. Here, if it is determined that no supply flag is set, the supply flag is set in step S21, and then, the processing returns again to step S11.

If it is determined in the previous step S16 that the temperature $T_G$ of the heating portion 27a of the glow plug 27 is lower than the ignition temperature $T_F$, that is, the temperature $T_G$ of the heating portion 27a of the glow plug 27 does not reach the ignition temperature $T_F$, the processing returns to S11 as it is. Moreover, also if it is determined in S17 that the exhaust temperature $T_E$ is lower than the lowest exhaust temperature $T_L$, that is, there is a fear of degradation of the ignition of the fuel since the exhaust temperature $T_E$ is too low, the processing returns to S11 as it is. In the same manner, also if it is determined in step S18 that the flow rate $G_a$ exceeds the threshold flow rate $G_R$, that is, there is a fear of the extinction of the ignited fuel caused by the exhaust gas current, the processing returns to S11 as it is. Additionally, also if it is determined in step S20 that the supply flag is set, the processing returns to S11 as it is.

In contrast, if it is determined in the previous step S13 that the engine 10 is not in the operational state in which the fuel can ignite, the processing proceeds to step S22, in which it is determined whether or not the supply flag is set. Here, if it is determined that the supply flag is set, that is, the fuel is supplied to the exhaust passage 21a, the processing proceeds to step S23. Here, the fuel supply is stopped in order to avoid the possibility of the extinction; the glow plug 27 is switched to the de-energization state; the temperature of the heating portion 27a is returned to the non-heat temperature $T_N$; and all of the preheating flag, the heating flag, the supply flag are reset. Hence, the processing returns to step S11, and then, the above-described processing is repeated.

If it is determined in the previous step S22 that the supply flag is not set, that is, the fuel is not supplied, the processing returns to S11.

Although the temperature of the heating portion 27a of the glow plug 27 is selectively set to the preheat temperature $T_H$ and the ignition temperature $T_F$ in the above-described embodiment, the temperature of the heating portion 27a of the glow plug 27 may be immediately raised to the ignition temperature $T_F$ in place of the preheating based on the preheating determination.

It should be noted that, the present invention should be interpreted based only upon the matters described in claims, and in the aforementioned embodiments, all changes and modifications included within the spirit of the present invention can be made other than the described matters. That is, all the matters in the described embodiments are made not to limit the present invention, but can be arbitrarily changed according to the application, the object and the like, including every construction having no direct relation to the present invention.

REFERENCE SIGNS LIST 10 engine
12 combustion chamber
13a operational state determining section
13f warm up determining section
13i heat generation temperature setting section
13k exhaust heating predicting section
13l exhaust heating determining section
13m supplying ability determining section
14 accelerator position sensor
21a exhaust passage
25 exhaust heating device
26 fuel supplying valve
27 glow plug
27a heating portion
28 exhaust emission purifier
31 torque converter
32 vehicle navigation system
33 transmission
36 cruise control switch (cruise switch)
37 obstacle sensor
38 vehicle speed sensor
39 shift position sensor
$T_F$ ignition temperature
$T_H$ preheat temperature
$T_N$ non-heat temperature

The invention claimed is:

1. An operation control apparatus for an internal combustion engine, comprising:
   an exhaust emission purifier for purifying exhaust gas from an internal combustion engine;
   a fuel supplying valve for supplying fuel to an exhaust passage extending from the internal combustion engine to the exhaust emission purifier;
   an igniter having a heating portion and being configured to ignite the fuel supplied to the exhaust passage by the fuel supplying valve;
   a torque converter that is interposed between the internal combustion engine and a transmission and having a lockup mechanism, and
   an electronic control unit configured to:
      make a warm up determination of whether or not the exhaust emission purifier need be warmed by the fuel supplying valve and the igniter;
      make an exhaust heating determination of whether or not the engine is in an operational state in which the fuel should be supplied to the exhaust passage by the fuel supplying valve and the fuel should be ignited and burned by the igniter in a case where the electronic control unit determines that the exhaust emission purifier need be warmed;
      make an exhaust heating prediction of the transition from the operational state in which the fuel is supplied to the exhaust passage and should not be ignited and burned to an operational state in which the fuel should be supplied to the exhaust passage and should be ignited and burned;
      make a lockup determination of whether or not the internal combustion engine and the transmission are in a direct coupling operational zone by the lockup mechanism of the torque converter;
      make a transition prediction of the transition to the operational state in which the fuel should be supplied to the exhaust passage and should be ignited and burned if the electronic control unit determines that the internal combustion engine and the transmission are in the direct coupling operational zone by the lockup mechanism of the torque converter; and set the temperature of the heating portion of the igniter based on the exhaust heating determination and the exhaust heating prediction.

2. The operation control apparatus for an internal combustion engine as claimed in claim 1, wherein the electronic control unit is further configured to:

make a downshift determination of whether or not the transmission is being downshifted; and make a fuel injection quantity determination of whether or not the injection quantity of the fuel to be injected into a cylinder in the internal combustion engine is less than a predetermined quantity; and wherein the electronic control unit determines that the internal combustion engine and the transmission are in the direct coupling operational zone if it is determined that the transmission is being downshifted and the injection quantity of the fuel to be injected into the cylinder in the internal combustion engine is less than the predetermined quantity.

3. An operation control method for an internal combustion engine, wherein a torque converter having a lockup mechanism is interposed between the internal combustion engine and a transmission, the method comprising the steps of:

determining whether or not to need to warm an exhaust emission purifier by a fuel supplying valve for supplying fuel to an exhaust passage extending from an internal combustion engine to the exhaust emission purifier and an igniter having a heating portion and being configured to ignite the fuel supplied to the exhaust passage by the fuel supplying valve;

determining whether or not the engine is in an operational state in which the fuel should be supplied to the exhaust passage by the fuel supplying valve and the fuel should be ignited and burned by the igniter in a case where it is determined in the determining step that the exhaust emission purifier need be warmed;

predicting the transition from the operational state in which the fuel should be supplied to the exhaust passage and should not be ignited and burned to an operational state in which the fuel should be supplied to the exhaust passage and should be ignited and burned, wherein predicting the transition to the operational state in which the fuel should be supplied to the exhaust passage and should be ignited and burned includes the step of determining whether or not the internal combustion engine and the transmission are in a direct coupling operational zone by the lockup mechanism of the torque converter, and the transition to the operational state in which the fuel should be supplied to the exhaust passage and should be ignited and burned is predicted if it is determined that the internal combustion engine and the transmission are in the direct coupling operational zone; and setting the temperature of the heating portion of the igniter based on the determination result whether or not the engine is in the operational state in which the fuel should be supplied to the exhaust passage and should be ignited and burned and the prediction result whether or not the engine is changed to the operational state in which the fuel should be supplied to the exhaust passage and should be ignited and burned.

4. The operation control method for an internal combustion engine as claimed in claim 3, wherein the step of determining whether or not the internal combustion engine and the transmission are in the direct coupling operational zone further includes the steps of:

determining whether or not the transmission is being downshifted; and determining whether or not the injection quantity of the fuel injected into a cylinder in the internal combustion engine is less than a predetermined quantity;

wherein it is determined that the internal combustion engine and the transmission are in the direct coupling operational zone if it is determined that the transmission is being downshifted and the injection quantity of the fuel injected into the cylinder is less than the predetermined quantity.

* * * * *